United States Patent
Tamekuni et al.

(10) Patent No.: US 8,539,796 B2
(45) Date of Patent: Sep. 24, 2013

(54) METHOD FOR ASSEMBLING OPTICAL CONNECTOR

(75) Inventors: Yoshikyo Tamekuni, Chigasaki (JP); Yuji Suzuki, Chigasaki (JP); Yukihiro Yokomachi, Yokohama (JP)

(73) Assignees: SEI Optifrontier Co., Ltd., Yokohama-shi, Kanagawa (JP); Sumitomo Electric Industries, Ltd., Osaka-shi, Osaka (JP)

( * ) Notice: Subject to any disclaimer, the term of this patent is extended or adjusted under 35 U.S.C. 154(b) by 32 days.

(21) Appl. No.: 13/143,387

(22) PCT Filed: Oct. 27, 2010

(86) PCT No.: PCT/JP2010/069062
§ 371 (c)(1),
(2), (4) Date: Jul. 6, 2011

(87) PCT Pub. No.: WO2011/052634
PCT Pub. Date: May 5, 2011

(65) Prior Publication Data
US 2011/0265521 A1 Nov. 3, 2011

(30) Foreign Application Priority Data
Oct. 28, 2009 (JP) ................................. 2009-248028

(51) Int. Cl.
*G02B 6/36* (2006.01)

(52) U.S. Cl.
USPC ................................. 65/407; 385/81; 385/85

(58) Field of Classification Search
USPC ........................................ 65/407; 385/81, 85
See application file for complete search history.

(56) References Cited

U.S. PATENT DOCUMENTS

| 5,748,819 | A | * | 5/1998 | Szentesi et al. | 385/60 |
| 5,764,837 | A | * | 6/1998 | Roller | 385/92 |
| 5,774,613 | A | * | 6/1998 | Tanabe et al. | 385/84 |
| 6,227,717 | B1 | * | 5/2001 | Ott et al. | 385/53 |
| 6,626,582 | B2 | * | 9/2003 | Farrar et al. | 385/53 |
| 2002/0090179 | A1 | | 7/2002 | Iwano et al. | |

FOREIGN PATENT DOCUMENTS

| CN | 1809773 | 7/2006 |
| CN | 201152902 Y | 11/2008 |
| EP | 1 045 267 | 10/2000 |

(Continued)

*Primary Examiner* — John Hoffmann
(74) *Attorney, Agent, or Firm* — Drinker Biddle & Reath LLP

(57) ABSTRACT

An optical connector assembling method capable of preventing workability from worsening is provided. First, when assembling the optical connector, an optical cord (2) is passed through a rear housing (8), an outer jacket holding member (9), a securing member (10), and a boot (11), and an outer jacket (4) is removed from a leading end portion of the optical cord (2), so as to expose a coated optical fiber (3) and a tension-resistant fiber (5). A handled dust cap (16A) is mounted to a ferrule member (6) holding a built-in fiber. Then, a fusion splicer fusion-splices the built-in fiber and the coated optical fiber (3) to each other. Thereafter, while the ferrule member (6) keeps the handled dust cap (16A) mounted thereto, a plug housing (7) is assembled to the rear housing (8). Then, the outer jacket holding member (9) and securing member (10) secure the outer jacket (4) and tension-resistant fiber (5) to the rear housing (8), and the boot (11) is mounted to the securing member (10). Finally, a handle (16a) is cut off from the handled dust cap (16A).

1 Claim, 22 Drawing Sheets

(56) References Cited

FOREIGN PATENT DOCUMENTS

| | | |
|---|---|---|
| JP | 2007-286599 | 11/2007 |
| JP | 2008-181004 | 8/2008 |
| JP | 2008-197622 | 8/2008 |
| JP | 2009-503582 | 1/2009 |
| JP | 2009-237515 | 10/2009 |
| JP | 2001-013373 | 1/2011 |
| KR | 10-2009-0078350 | 7/2009 |
| KR | 10-2009-0083373 | 8/2009 |

* cited by examiner

METHOD FOR ASSEMBLING OPTICAL CONNECTOR

TECHNICAL FIELD

The present invention relates to a method for assembling an optical connector equipped with a ferrule member holding a built-in fiber.

BACKGROUND ART

As a conventional optical connector assembling method, one disclosed in Patent Literature 1 has been known, for example. The optical connector assembling method disclosed in Patent Literature 1 is one in which, while an optical cord is passed through a rear housing and a protection sleeve, a coated optical fiber exposed by removing an outer jacket of a leading end portion of the optical cord and a short optical fiber held by a connector ferrule are fusion-spliced to each other, the fusion-spliced part is covered with the protection sleeve, and then a plug frame and the rear housing are joined to each other, so as to be integrated with each other.

Patent Literature 2 discloses that, while a holding part of a ferrule holder (protection cap) is fitted onto a tubular part of a ferrule, a built-in optical fiber held by the ferrule and a coated optical fiber to be connected thereto are fusion-spliced to each other.

CITATION LIST

Patent Literature

Patent Literature 1: Japanese Patent Application Laid-Open No. 2008-197622
Patent Literature 2: Japanese Patent Application Laid-Open No. 2007-286599

SUMMARY OF INVENTION

Technical Problem

After performing fusion splicing while mounting a protection cap to a ferrule as disclosed in the above-mentioned Patent Literature 2, the protection cap has conventionally been removed from the ferrule at the time of joining the plug frame to the rear housing. However, carelessly removing the protection cap from the ferrule may pull and twist the coated optical fiber, thereby breaking the latter. This makes it hard to remove the ferrule from the protection cap, thereby worsening workability.

It is an object of the present invention to provide an optical connector assembling method which can prevent workability from worsening.

Solution to Problem

The present invention provides a method for assembling an optical connector comprising a ferrule member having a ferrule body holding a built-in fiber, a first housing for accommodating the ferrule member, and a second housing for introducing therein an optical fiber to be connected to the built-in fiber; the method comprising the steps of mounting a protection cap to the ferrule body, fusion-splicing the optical fiber introduced in the second housing and the built-in fiber to each other, and inserting the protection cap mounted with the ferrule body into the first housing, so as to assemble the first and second housings to each other.

Thus, in the optical connector assembling method in accordance with the present invention, while the ferrule body of the ferrule member is mounted with the protection cap, the optical fiber introduced in the second housing and the built-in fiber held by the ferrule body are fusion-spliced to each other. Thereafter, while the protection cap is mounted to the ferrule body without being removed therefrom, the first and second housings are assembled to each other, so as to construct the optical connector. This eliminates the time and effort to remove the protection cap from the ferrule body so as not to pull or twist the optical fiber, thereby making it possible to prevent workability from worsening.

Preferably, the protection cap has a handle provided at a leading end thereof, while the method further comprises the step of cutting the handle off after performing the step of assembling the first and second housings to each other.

Using the protection cap having a leading end provided with the handle makes it easier for the protection cap mounted with the ferrule body to carry and treat when fusion-splicing the optical fiber and the built-in fiber to each other. After assembling the first and second housings to each other, the handle of the protection cap becomes unnecessary and thus is preferably cut off.

Advantageous Effects of Invention

Since the optical connector is assembled without removing the protection cap from the ferrule body of the ferrule member, the present invention can prevent workability from worsening.

DESCRIPTION OF EMBODIMENTS

Figure 1:
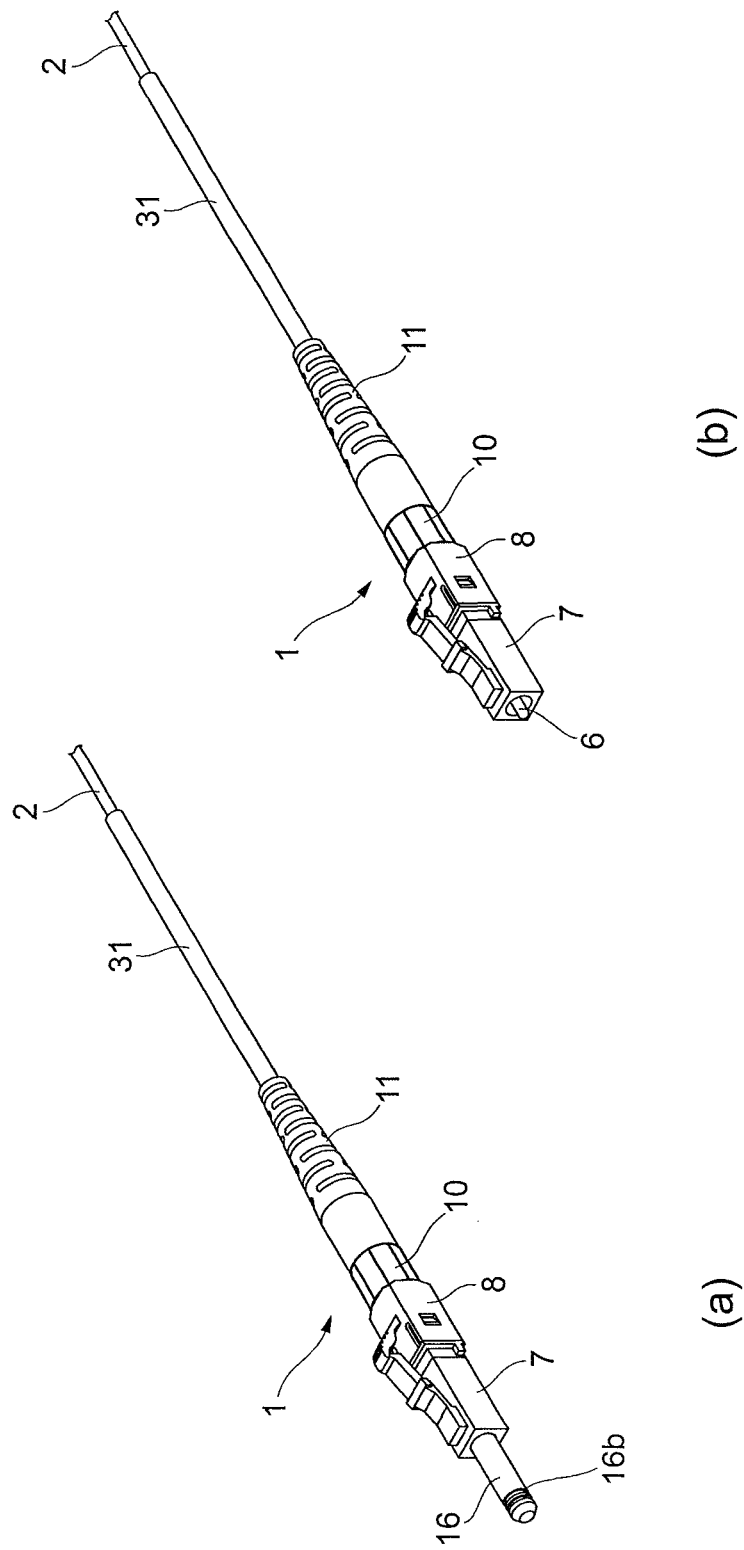
FIG. 1 is a perspective view illustrating an optical connector assembled by one embodiment of the optical connector assembling method in accordance with the present invention.

In the following, preferred embodiments of the optical connector assembling method in accordance with the present invention will be explained in detail with reference to the drawings. In the drawings, the same or equivalent members will be referred to with the same signs while omitting their overlapping explanations.

Figure 2:
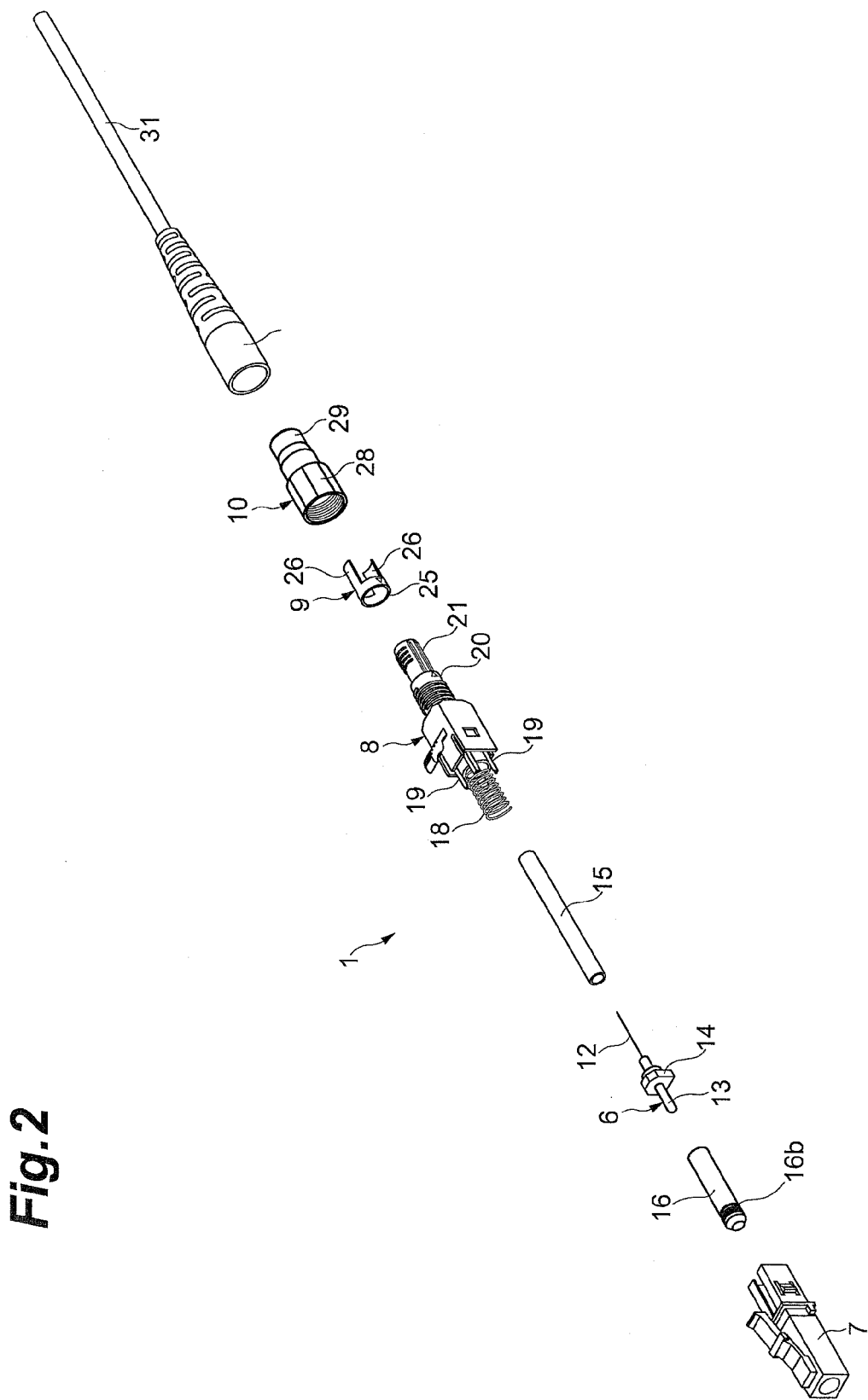
FIG. 2 is an exploded perspective view of the optical connector illustrated in FIG. 1(a)
Figure 3:
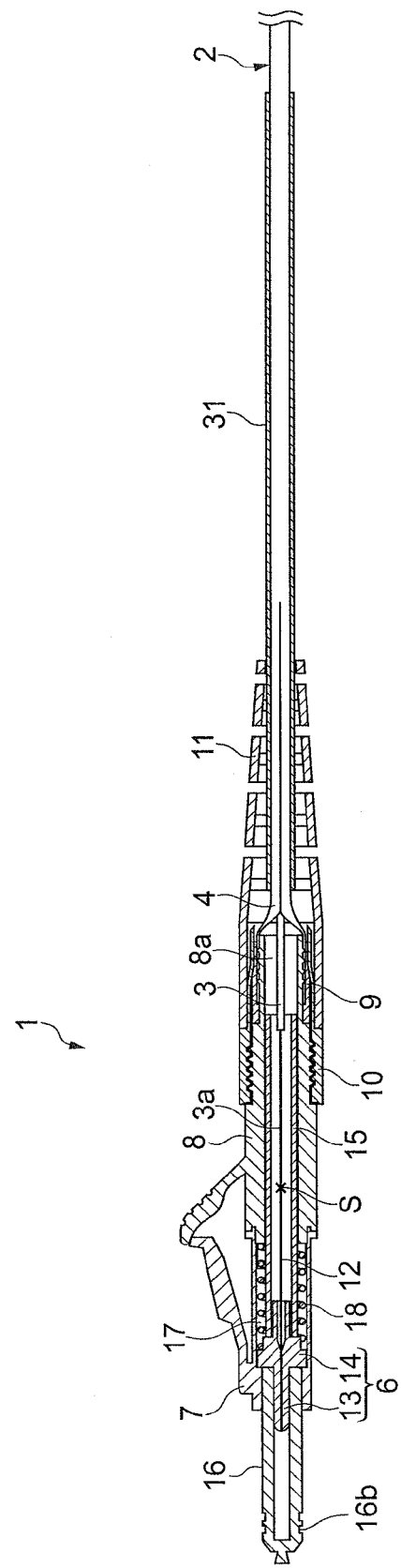
FIG. 3 is a sectional view of the optical connector illustrated in FIG. 1(a)

FIG. 1 is a perspective view illustrating an optical connector assembled by one embodiment of the optical connector assembling method in accordance with the present invention. FIG. 2 is an exploded perspective view of the optical connector illustrated in FIG. 1(a), while FIG. 3 is a sectional view of the optical connector illustrated in FIG. 1(a).

Figure 5:
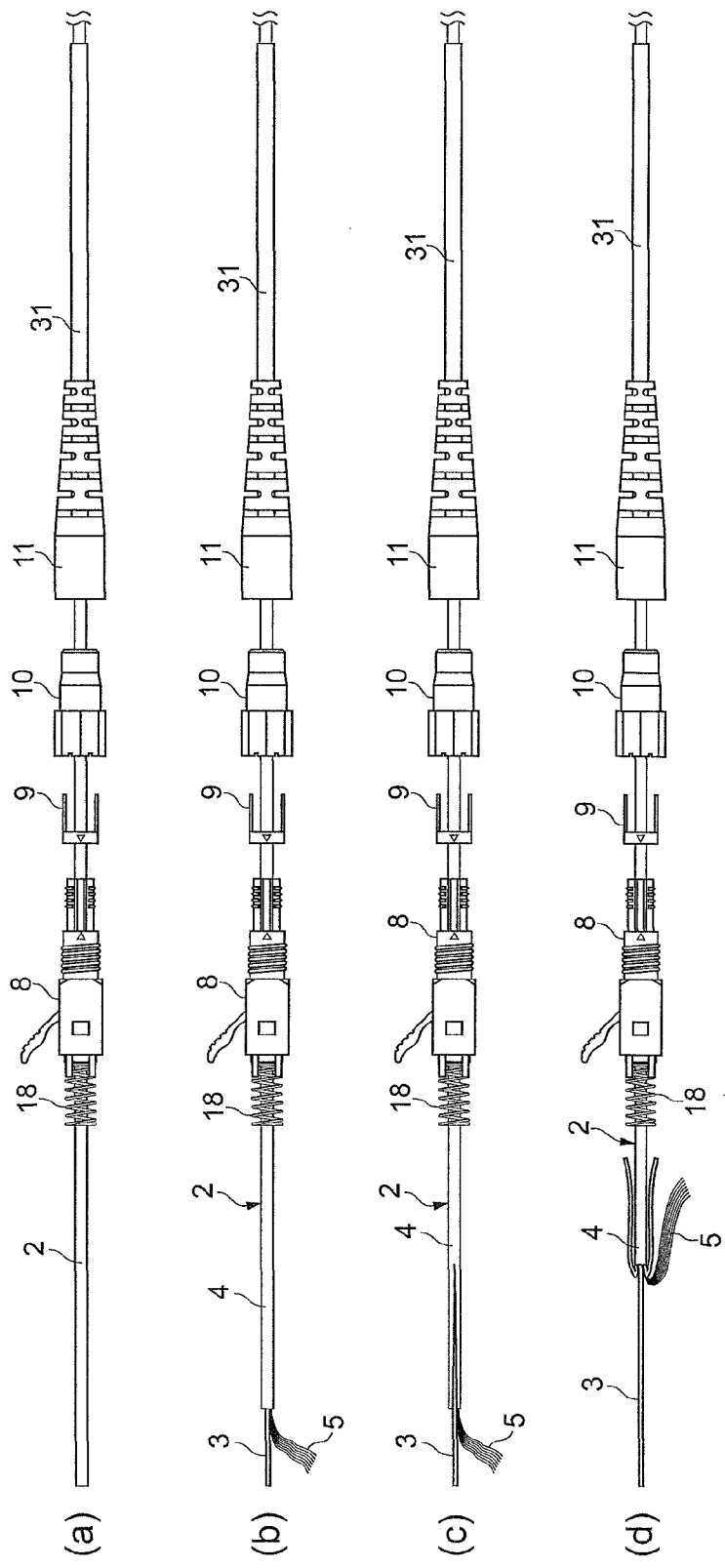
FIG. 5 is a view illustrating a procedure of assembling the optical connector depicted in FIG. 1(a)

In each of the drawings, the optical connector 1 of this embodiment is a cord type LC connector having an optical cord 2 assembled thereto. The optical cord 2 has a coated optical fiber 3, an outer jacket 4 covering the coated optical fiber 3, and a tensile-resistant fiber (Kevlar) 5 having a very small diameter interposed between the coated optical fiber 3 and outer jacket 4. The tensile-resistant fiber 5 is incorporated in the optical cord 2 while being assembled into a bundle (see FIG. 5).

The optical connector 1 comprises a ferrule member 6, a plug housing 7 accommodating the ferrule member 6, a rear housing 8 joined to a rear end part of the plug housing 7, an outer jacket holding member 9 and a securing member 10 which are mounted to the rear housing 8, and a boot 11 attached to the securing member 10.

The ferrule member 6 has a ferrule body 13 holding a short built-in fiber 12 and a flange 14 secured to the ferrule body 13.

The built-in fiber 12 extends by a predetermined length rearward from the ferrule member 6. The leading end of the coated optical fiber 3 exposed by removing the outer jacket 4 from a leading end portion of the optical cord 2 is fusion-spliced to the leading end of the built-in fiber 12. Thus fusion-spliced part S between the built-in fiber 12 and the coated optical fiber 3 is protected by a fusion protection sleeve 15.

When the optical connector 1 is not in use (not connector-coupled to its opposite optical connector), the ferrule body 13 is covered with a dust cap (protection cap) 16 for protecting the ferrule body 13 against dust, dirt, and the like (see FIG. 1(a)). The dust cap 16 has a substantially cylindrical form. For example, the dust cap 16 is formed from a heat-resistant plastic which neither melts nor softens at a high temperature of 200° C. An antislip corrugation 16b is provided on the outer circumferential face in the front-side portion of the dust cap 16.

The plug housing 7 is formed with an insertion hole 17 extending longitudinally therethrough. The insertion hole 17 has a size larger than the outer diameter of the dust cap 16 such that the dust cap 16 can pass therethrough. Specifically, in the front end portion of the plug housing 7, the insertion hole 17 has a circular cross section with a diameter slightly larger than the outer diameter of the dust cap 16.

The rear housing 8 is joined to the rear end part of the plug housing 7 through engaging means. The optical cord 2 is introduced into the housing 8 through the boot 11. The rear housing 8 is formed with an insertion hole 8a extending longitudinally therethrough. The above-mentioned fusion protection sleeve 15 is accommodated within the plug housing 7 and rear housing 8.

Figure 4:
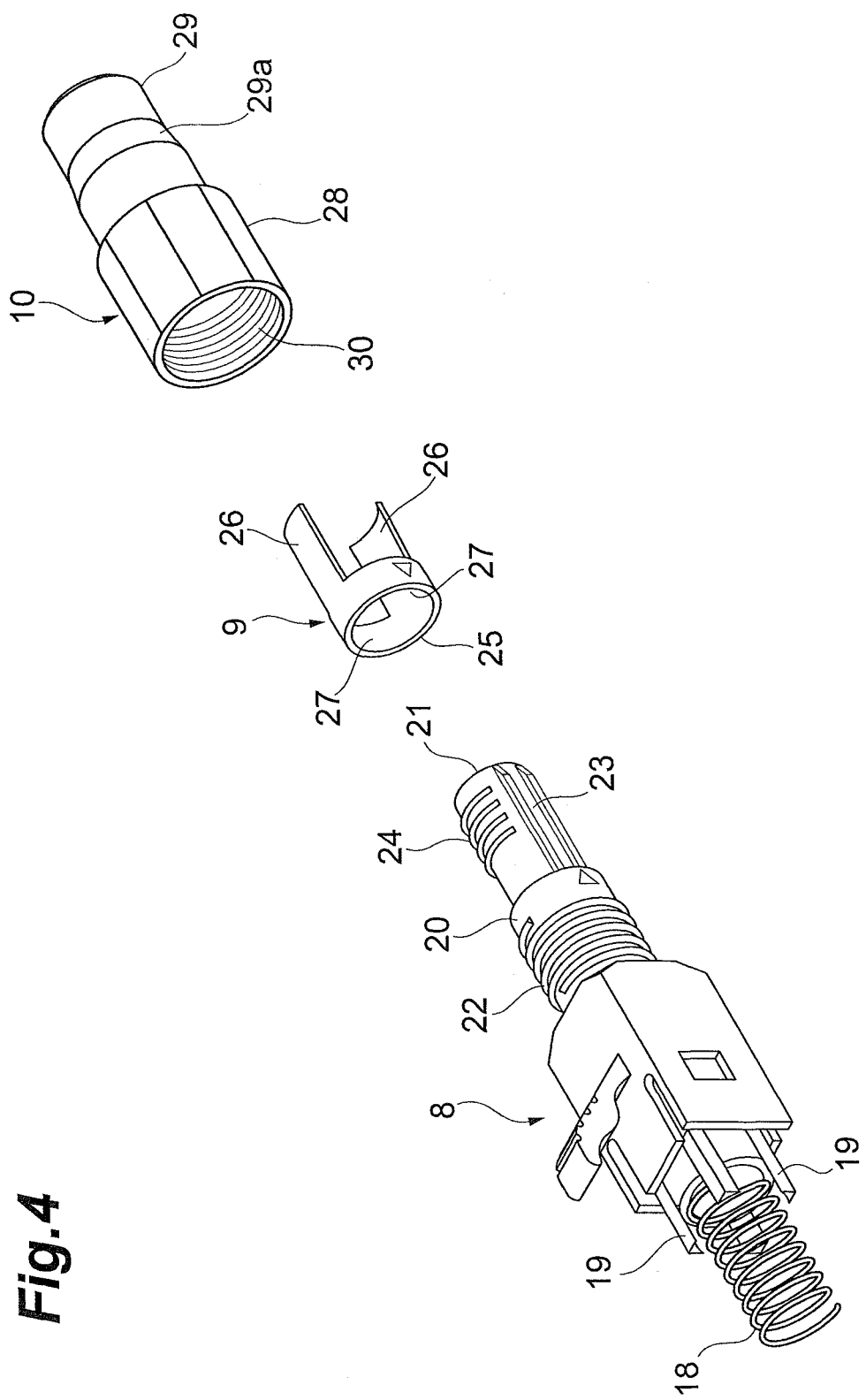
FIG. 4 is an exploded perspective view of a rear housing equipped with a spring, an outer jacket holding member, and a securing member which are illustrated in FIG. 2.

As illustrated in FIG. 4, the front end part of the rear housing 8 is provided with four support projections 19 which support a spring 18 for urging the ferrule member 6 forward. The spring 18 is disposed in the insertion hole 17 of the plug housing 7. Providing thus configured spring 18 enables PC (Physical Contact) connection with the opposite optical connector.

The support projections 19 project forward from the rear housing 8 and are disposed at equally spaced intervals in the circumferential direction thereof. Here, the spring 18 comes into contact with the inner walls of two opposing support projections 19 in the four support projections 19, for example, and thus is held easily and reliably by the front end part of the rear housing 8. The number of the support projections 19 is not limited to 4 in particular as long as they support the spring 18 at a plurality of locations.

The rear housing 8 has a larger tubular part 20 and a smaller tubular part 21 disposed on the rear side of the larger tubular part 20. The diameter of the smaller tubular part 21 is smaller than that of the larger tubular part 20. The outer circumferential face of the larger tubular part 20 is formed with a male thread 22.

On the outer circumferential face of the smaller tubular part 21, a pair of guide rails 23 for guiding the outer jacket holding member 9 are formed such as to extend longitudinally. A pair of blades 24 for securing the outer jacket 4 of the optical cord 2 are also formed on the outer circumferential face of the smaller tubular part 21.

The above-mentioned outer jacket holding member 9 and securing member 10 are mounted to thus constructed rear housing 8. The outer jacket holding member 9 has an annular part 25 adapted to fit onto the smaller tubular part 21 and a pair of holding arms 26 which are integrated with the annular part 25 and extend axially of the annular part 25. The inner circumferential face of the annular part 25 is formed with a pair of protrusions 27 adapted to engage the respective guide rails 23 of the smaller tubular part 21.

The securing member 10 has a substantially tubular form. The securing member 10 has a tensile-resistant fiber securing part 28 for securing the tensile-resistant fiber 5 (see FIG. 5) to the larger tubular part 20 of the rear housing 8 and an outer jacket securing part 29, provided on the rear side of the tensile-resistant fiber securing part 28, for securing the outer jacket 4 of the optical cord 2 to the smaller tubular part 21 of the rear housing 8 through the holding arms 26.

The inner circumferential face of the tensile-resistant fiber securing part 28 is formed with a female thread 30 adapted to mate with the male thread 22 of the larger tubular part 20. Here, a predetermined clearance is provided between the male thread 22 and the female thread 30 so that the larger tubular part 20 and the tensile-resistant fiber securing part 28 can hold the tensile-resistant fiber 5 therebetween.

The outer jacket securing part 29 has a tapered region 29a which tapers down to the rear side of the securing member 10. Therefore, the opening diameter at the rear end of the securing member 10 is smaller than that at the front end of the securing member 10. Specifically, the opening diameter at the rear end of the securing member 10 is smaller than the outer diameter of the outer jacket holding member 9.

Returning to FIGS. 1 to 3, the above-mentioned boot 11 is mounted to the outer jacket securing part 29. The boot 11 protects the optical cord 2 such that no drastic bend acts on the optical cord 2 behind the rear housing 8. A reinforcement tube 31 has been attached to the boot 11 beforehand.

A procedure of assembling thus configured optical connector 1 will now be explained. First, as illustrated in FIG. 5(a), the rear housing 8 having the spring 18 attached thereto, the outer jacket holding member 9, the securing member 10, and the boot 11 having the reinforcement tube 31 attached thereto are arranged in this order from the front side, and the optical cord 2 is passed through these components from the rear side (reinforcement tube 31 side).

Next, as illustrated in FIG. 5(b), the outer jacket 4 is removed from the leading end portion of the optical cord 2, so as to expose the coated optical fiber 3 and the tensile-resistant fiber 5. Then, an unnecessary part of the tensile-resistant fiber 5 is cut off. Subsequently, as illustrated in FIG. 5(c), the leading end portion of the outer jacket 4 is torn into a bifurcated form. Thereafter, as illustrated in FIG. 5(d), the bifurcated outer jacket 4 and the tensile-resistant fiber 5 are turned over.

Figure 6:
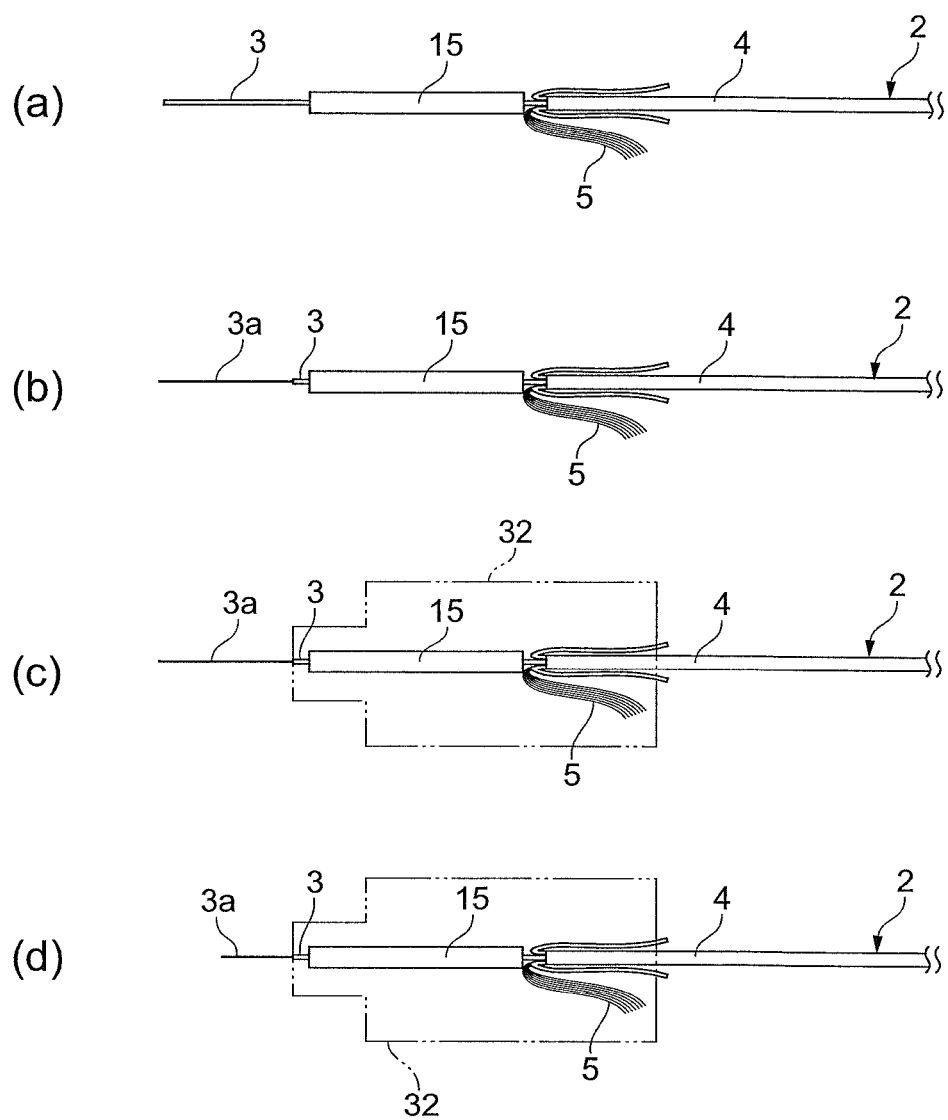
FIG. 6 is a view illustrating the procedure of assembling the optical connector depicted in FIG. 1(a)

Next, as illustrated in FIG. 6(a), the coated optical fiber 3 is passed through the fusion protection sleeve 15. Then, as illustrated in FIG. 6(b), the coating is removed from a leading end portion of the coated optical fiber 3, so as to expose and clean a bare fiber 3a. Subsequently, as illustrated in FIG. 6(c), a leading end portion of the optical cord 2 is set in a fusion fiber holder 32. Then, as illustrated in FIG. 6(d), a leading end part of the bare fiber 3a is cut off. Thereafter, the fusion fiber holder 32 is set in a fusion splicer (not depicted).

Figure 7:
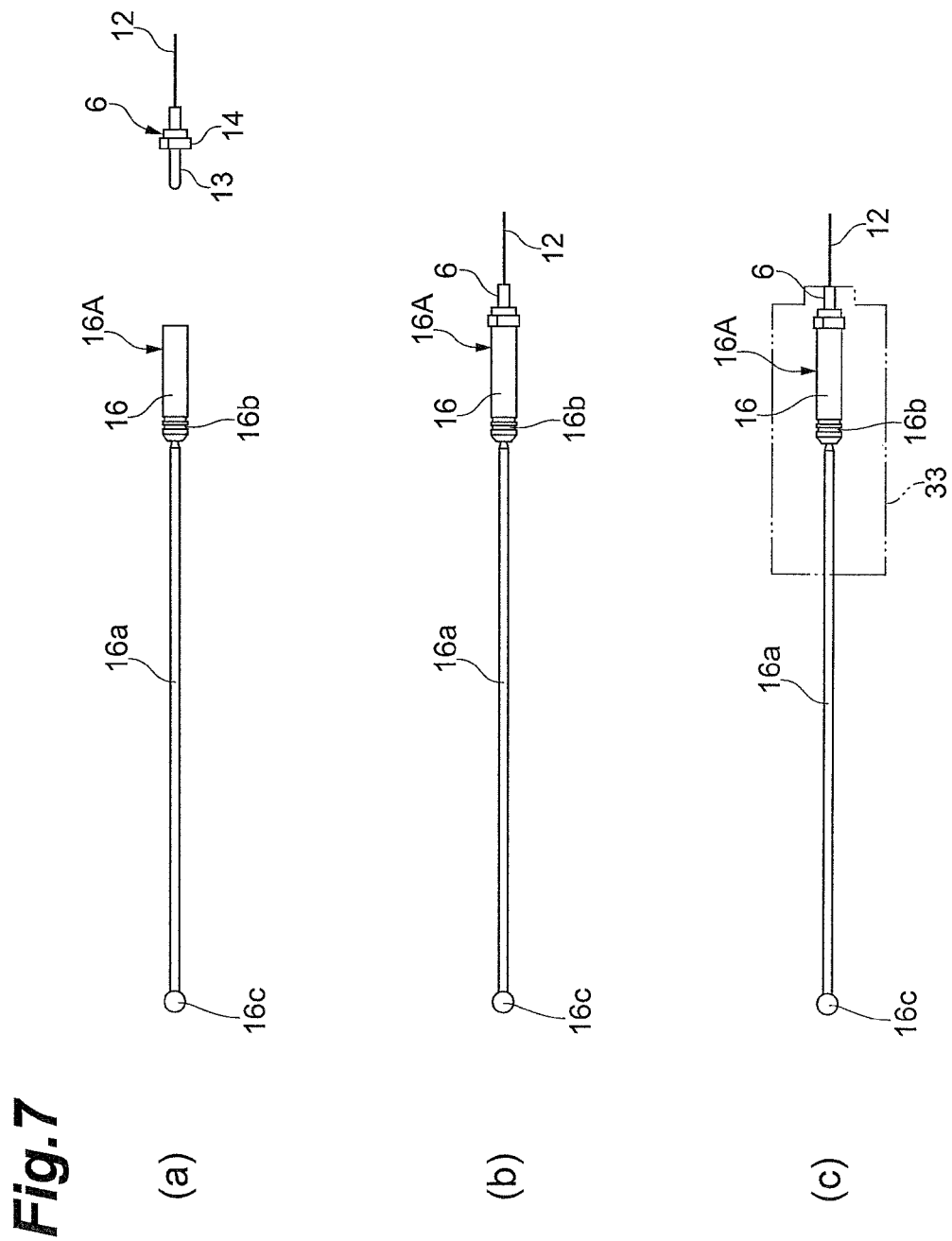
FIG. 7 is a view illustrating the procedure of assembling the optical connector depicted in FIG. 1(a)

On the other hand, as illustrated in FIG. 7(a), a handled dust cap 16A is prepared. The handled dust cap 16A is one in which a rod-shaped handle 16a is integrally attached to the leading end of the dust cap 16. A spherical terminal part 16c is disposed at a leading end part of the handle 16a. Providing thus configured terminal part 16c makes it possible to recognize the leading end part of the handle 16a by touching. The terminal part 16c may also be shaped like a strip or crank.

Subsequently, as illustrated in FIG. 7(b), the handled dust cap 16A is mounted to the ferrule body 13 of the ferrule member 6 holding the built-in fiber 12. Then, as illustrated in FIG. 7(c), the ferrule member 6 having the handled dust cap 16A attached thereto is set in a ferrule holder 33. Here, holding the handle 16a of the handled dust cap 16A with one hand makes it easier to carry and set in the ferrule holder 33. Then, the ferrule holder 33 is set in the fusion splicer (not depicted).

Thereafter, the fusion splicer fusion-splices the leading end of the built-in fiber 12 and the leading end of the bare fiber 3a of the coated optical fiber 3 to each other.

Figure 8:
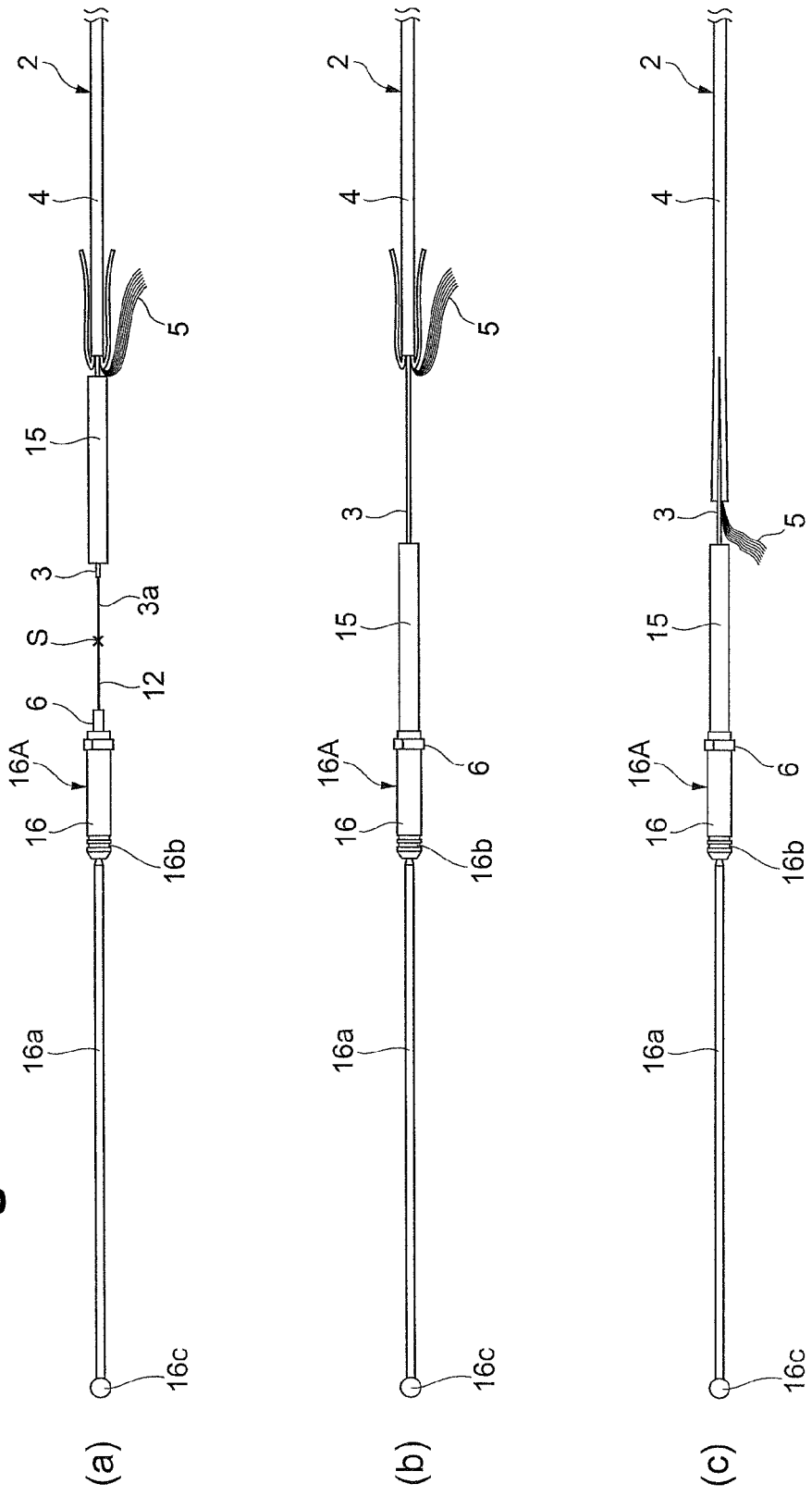
FIG. 8 is a view illustrating the procedure of assembling the optical connector depicted in FIG. 1(a)

Subsequently, as illustrated in FIG. 8(a), those set in the fusion fiber holder 32 and ferrule holder 33 are taken out therefrom. Here, holding the handle 16a of the handled dust cap 16A with one hand makes it easier to take them out from the fusion splicer.

Next, as illustrated in FIG. 8(b), the fusion protection sleeve 15 is moved to the position of the fusion-spliced part S between the built-in fiber 12 and the coated optical fiber 3 and heat-shrunk at a temperature of about 200° C. in this state. This keeps the fusion protection sleeve 15 from shifting from the position of the fusion-spliced part S. Then, as illustrated in FIG. 8(c), the turned-over outer jacket 4 and tensile-resistant fiber 5 are returned to their initial state.

Figure 9:
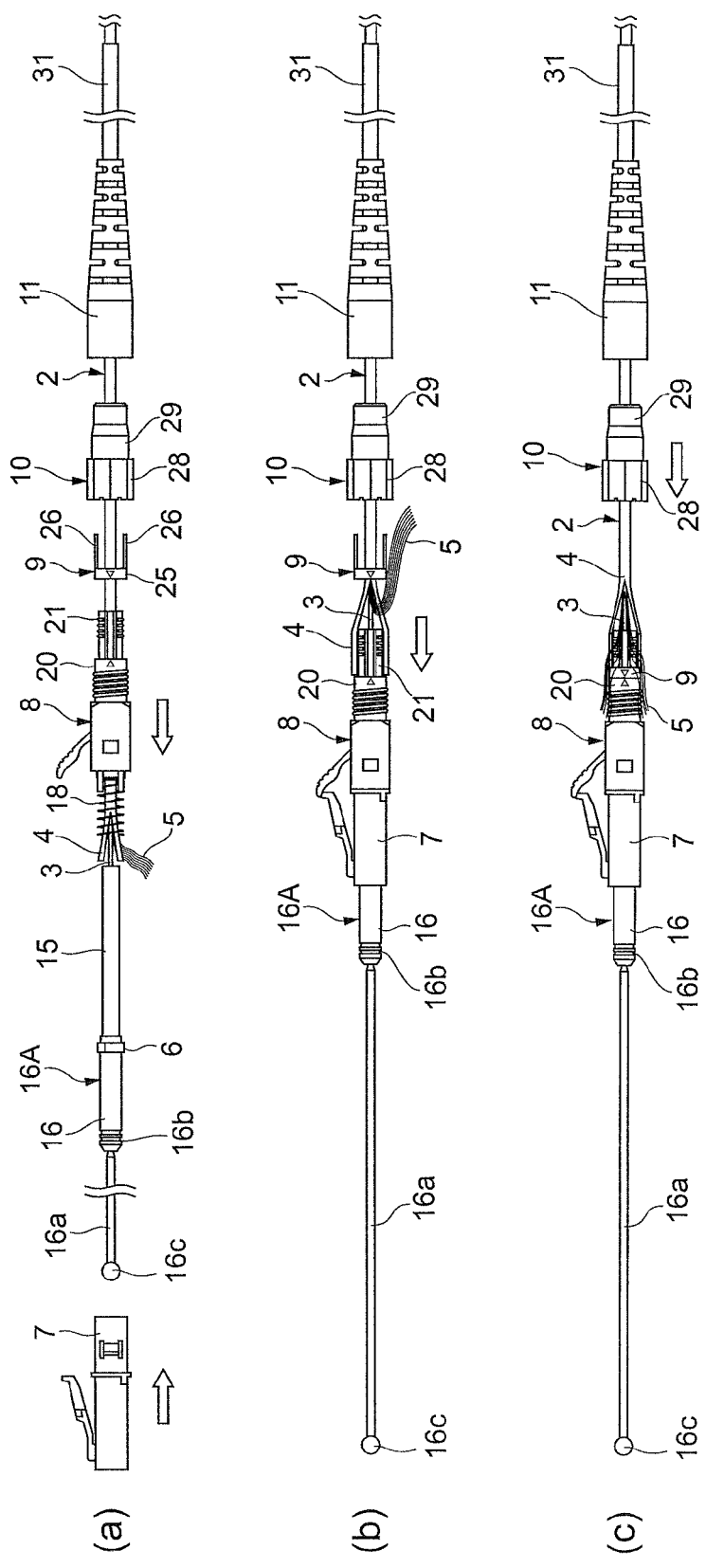
FIG. 9 is a view illustrating the procedure of assembling the optical connector depicted in FIG. 1(a)

Next, as illustrated in FIG. 9(a), the plug housing 7 is prepared. Subsequently, as illustrated in FIG. 9(b), the handled dust cap 16A is passed through the plug housing 7, so as to assemble the plug housing 7 to the rear housing 8. Then, as illustrated in FIG. 9(c), while the bifurcated outer jacket 4 is mounted on the blades 24 of the smaller tubular part 21 of the rear housing 8, the outer jacket holding member 9 is fitted onto the smaller tubular part 21. As a consequence, the blades 24 bite into the outer jacket 4.

Figure 10:
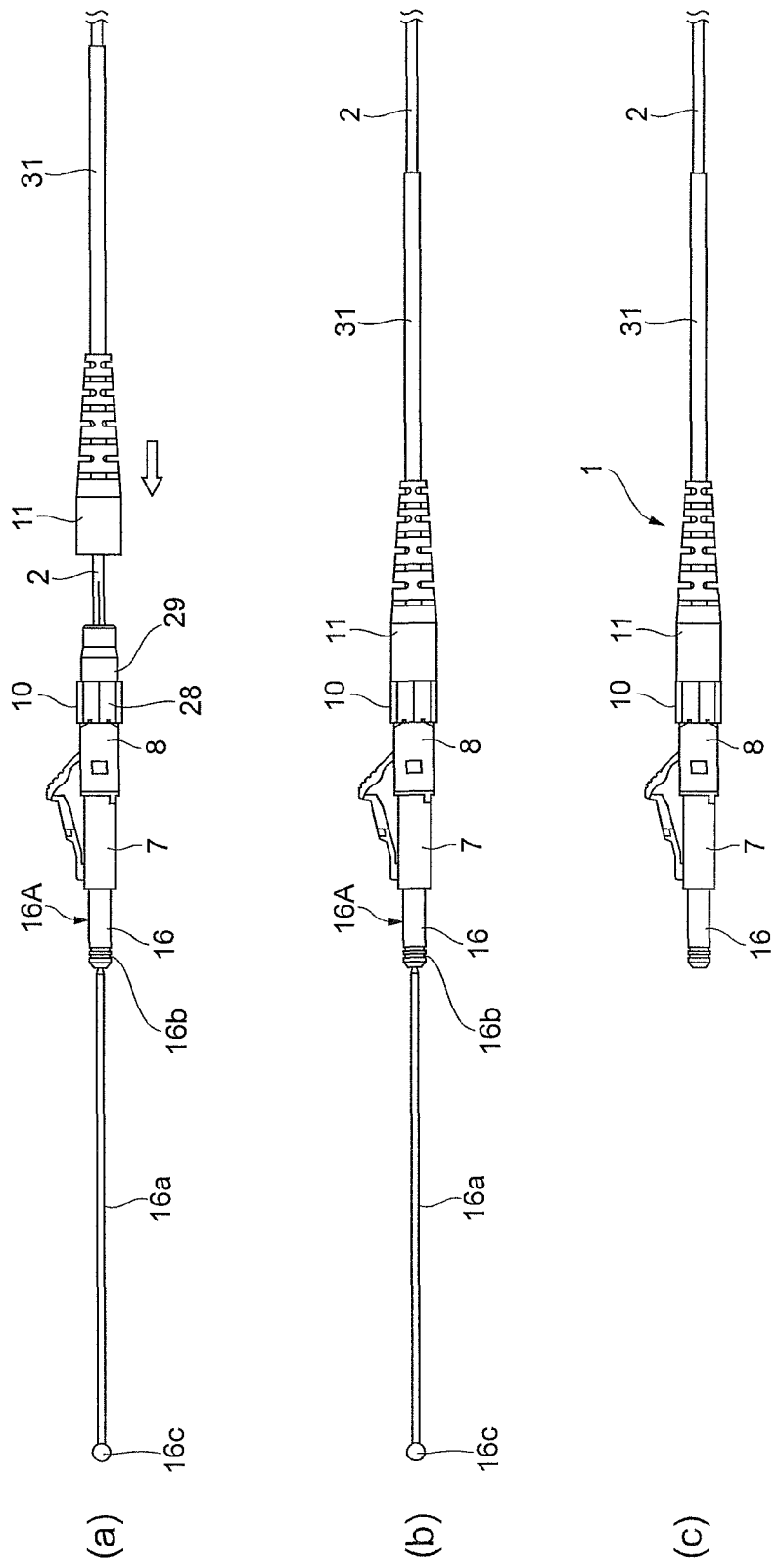
FIG. 10 is a view illustrating the procedure of assembling the optical connector depicted in FIG. 1(a)

Subsequently, while the tensile-resistant fiber 5 is mounted on the larger tubular part 20 of the rear housing 8, the securing member 10 is screwed onto the larger tubular part 20 as illustrated in FIG. 10(a). As a consequence, the tensile-resistant fiber 5 is held between the larger tubular part 20 and the tensile-resistant fiber securing part 28, so as to be secured.

The smaller tubular part 21 of the rear housing 8 is covered with the outer jacket securing part 29 of the securing member 10. Since the outer jacket securing part 29 has the tapered region 29a tapering down to the rear side of the securing member 10, each of the holding arms 26 of the outer jacket holding member 9 is pressed by the outer jacket securing part 29, so as to bend toward the smaller tubular part 21. As a consequence, the bifurcated outer jacket 4 is held between the outer jacket securing part 29 and the smaller tubular part 21 through the holding arms 26, so as to be secured firmly.

Subsequently, as illustrated in FIG. 10(b), the boot 11 having the reinforcement tube 31 attached thereto is mounted to the outer jacket securing part 29 of the securing member 10. Then, as illustrated in FIG. 10(c), the handle 16a is cut off from the handled dust cap 16A with fingers. The foregoing completes the optical connector 1 illustrated in FIG. 1(a).

The following problems occur when removing the handled dust cap 16A from the ferrule member 6 at the time of assembling the plug housing 7 to the rear housing 8 after reinforcing the fusion-spliced part S between the built-in fiber 12 and the coated optical fiber 3 with the fusion protection sleeve 15.

When reinforcing the fusion-spliced part S with the fusion protection sleeve 15, the ferrule member 6 and the handled dust cap 16A are also exposed to a high temperature of about 200° C. The handled dust cap 16A is formed from a heat-resistant resin as mentioned above and thus may slide out of the ferrule body 13 when the resin softens or thermally expands. For preventing this from occurring, the securing force of the handled dust cap 16A against the ferrule body 13 is typically made stronger.

In this case, however, the handled dust cap 16A is harder to remove from the ferrule member 6. Specifically, holding the fusion protection sleeve 15 with one hand and strongly pulling or twisting the handled dust cap 16A with the other hand may break the coated optical fiber 3 within the fusion protection sleeve 15. This makes it necessary to hold the flange 14 of the ferrule member 6 with the hand different from the one holding the handled dust cap 16A so as not to pull or twist the coated optical fiber 3. However, this operation is difficult, since the flange 14 is very small.

In this embodiment, by contrast, the insertion hole 17 of the plug housing 7 has such a size as to allow the handled dust cap 16A to pass therethrough, so that the plug housing 7 is assembled to the rear housing 8 while the ferrule body 13 keeps the handled dust cap 16A mounted thereto, whereby it is not necessary for the handled dust cap 16A to be removed from the ferrule body 13 during the operation of assembling the optical connector 1.

Therefore, workability will not be affected at all even if the securing force of the handled dust cap 16A against the ferrule body 13 is made stronger in order to prevent the handled dust cap 16A from sliding out of the ferrule body 13 when reinforcing the fusion-spliced part S. Since the handled dust cap 16A is not removed from the ferrule member 6, the coated optical fiber 3 can be prevented from breaking upon being pulled or twisted.

Figure 11:
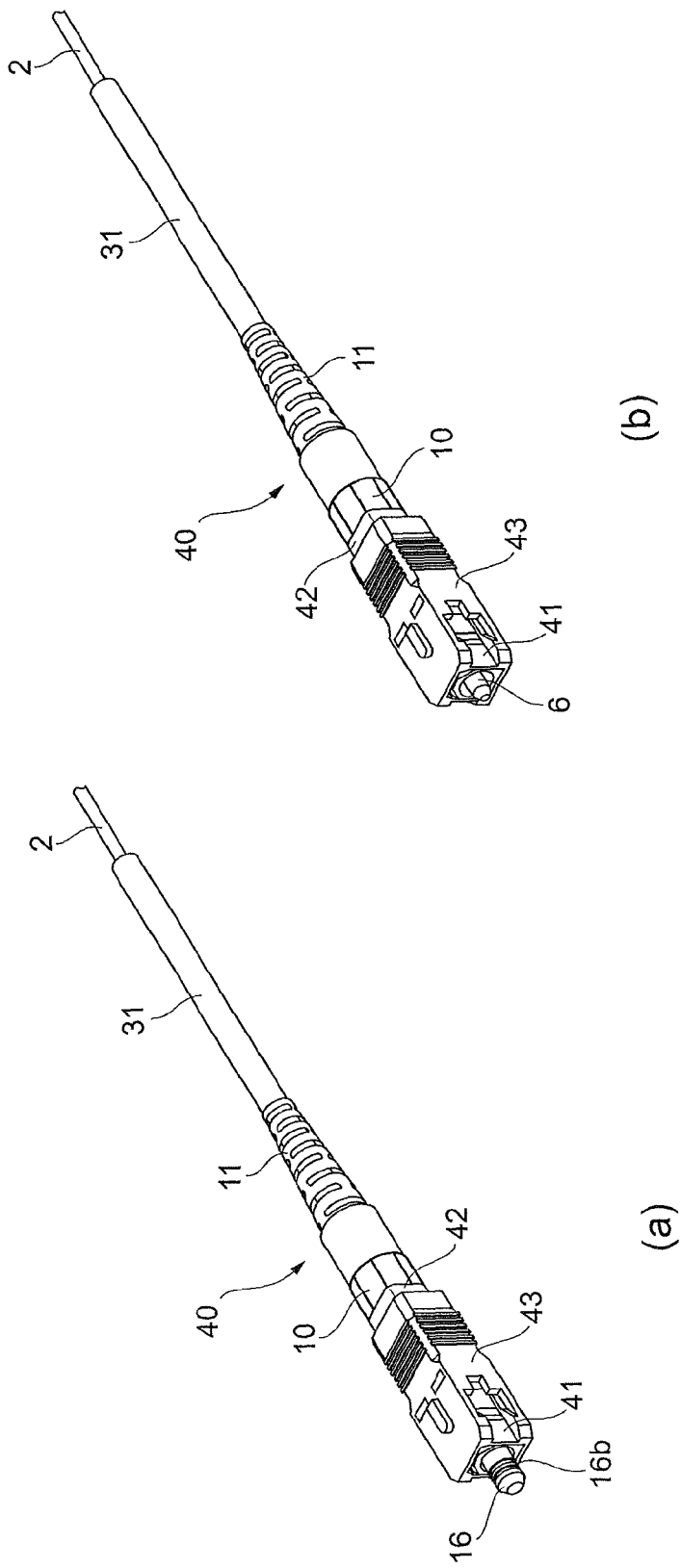
FIG. 11 is a perspective view illustrating another optical connector assembled by one embodiment of the optical connector assembling method in accordance with the present invention.
Figure 12:
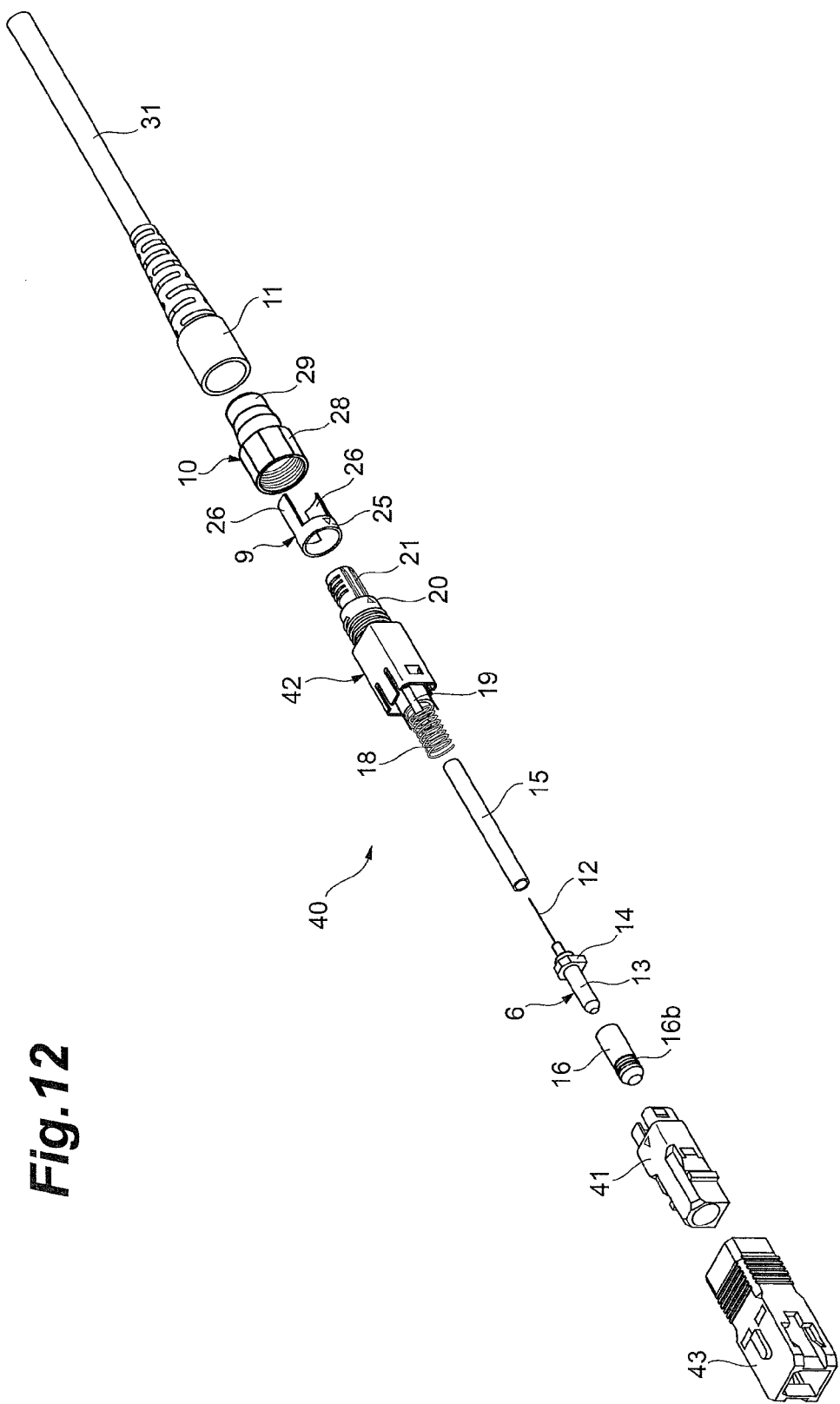
FIG. 12 is an exploded perspective view of the optical connector illustrated in FIG. 11(a)
Figure 13:
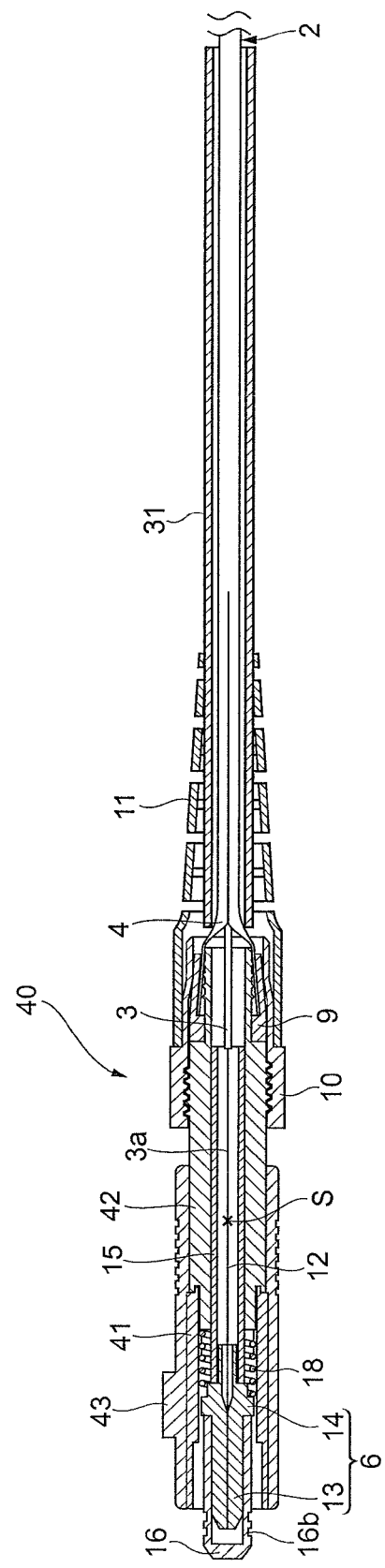
FIG. 13 is a sectional view of the optical connector illustrated in FIG. 11(a)

FIG. 11 is a perspective view illustrating another optical connector assembled by one embodiment of the optical connector assembling method in accordance with the present invention. FIG. 12 is an exploded perspective view of the optical connector illustrated in FIG. 11(a), while FIG. 13 is a sectional view of the optical connector illustrated in FIG. 11(a).

In each of the drawings, the optical connector 40 is a cord type LC connector having the optical cord 2 assembled thereto. The optical connector 40 comprises a plug housing 41 and a rear housing 42 in place of the plug housing 7 and rear housing 8 in the above-mentioned embodiment. The inner structure of the plug housing 41 is substantially the same as that of the above-mentioned plug housing 7. As with the above-mentioned rear housing 8, the rear housing 42 has the four support projections, larger tubular part 20, and smaller tubular part 21. The optical connector 40 further comprises a grip 43 covering the plug housing 41 and rear housing 42.

Figure 14:
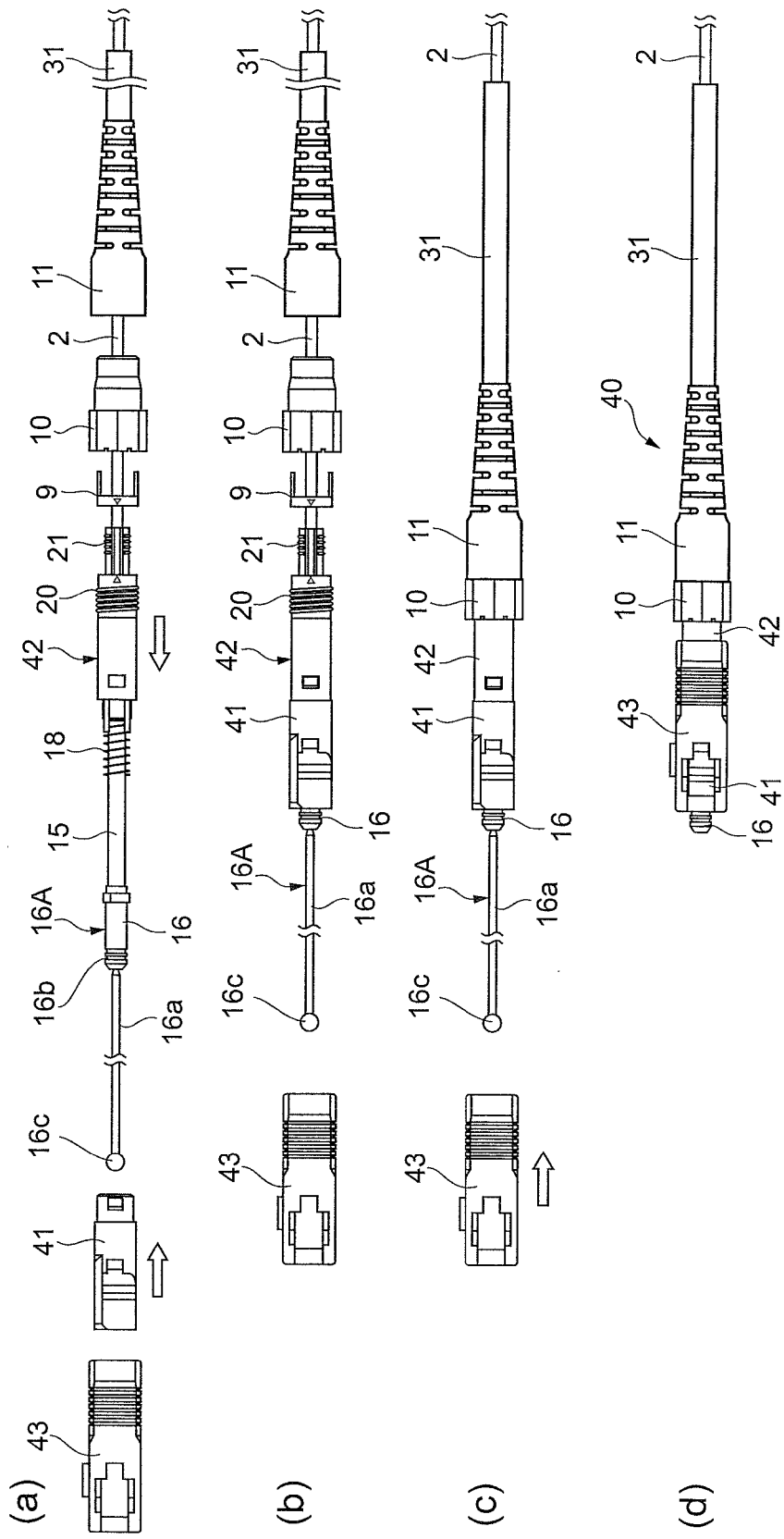
FIG. 14 is a view illustrating a procedure of assembling the optical connector depicted in FIG. 11(a)

For assembling thus configured optical connector 40, as illustrated in FIG. 14(a), while the handled dust cap 16A is mounted to the ferrule body 13 of the ferrule member 6, the rear housing 42 having the spring 18 attached thereto, the outer jacket holding member 9, the securing member 10, and the boot 11 having the reinforcement tube 31 attached thereto are arranged in this order from the front side, and the optical cord 2 is passed through these components from the their rear side. Then, while the coated optical fiber 3 is passed through the fusion protection sleeve 15, the built-in fiber 12 held by the ferrule member 6 and the coated optical fiber 3 of the optical cord 2 are fusion-spliced to each other as in the above-mentioned embodiment. Thereafter, the fusion protection sleeve 15 is moved to the position of the fusion-spliced part S between the built-in fiber 12 and the coated optical fiber 3 and heat-shrunk in this state.

Subsequently, as illustrated in FIG. 14(b), the handled dust cap 16A is passed through the plug housing 41, so as to assemble the plug housing 41 to the rear housing 42.

Thereafter, as illustrated in FIG. 14(c), the outer jacket 4 and tensile-resistant fiber 5 (not depicted) of the cord 2 are secured to the rear housing 42 by the outer jacket holding member 9 and the securing member 10, and the boot 11 is mounted to the securing member 10 as in the above-mentioned embodiment. Subsequently, as illustrated in FIG. 14(d), the grip 43 is assembled to the plug housing 41 and rear housing 42, and then the handle 16a of the handled dust cap 16A is cut off with fingers. The foregoing completes the optical connector 40 illustrated in FIG. 11(a).

Figure 15:
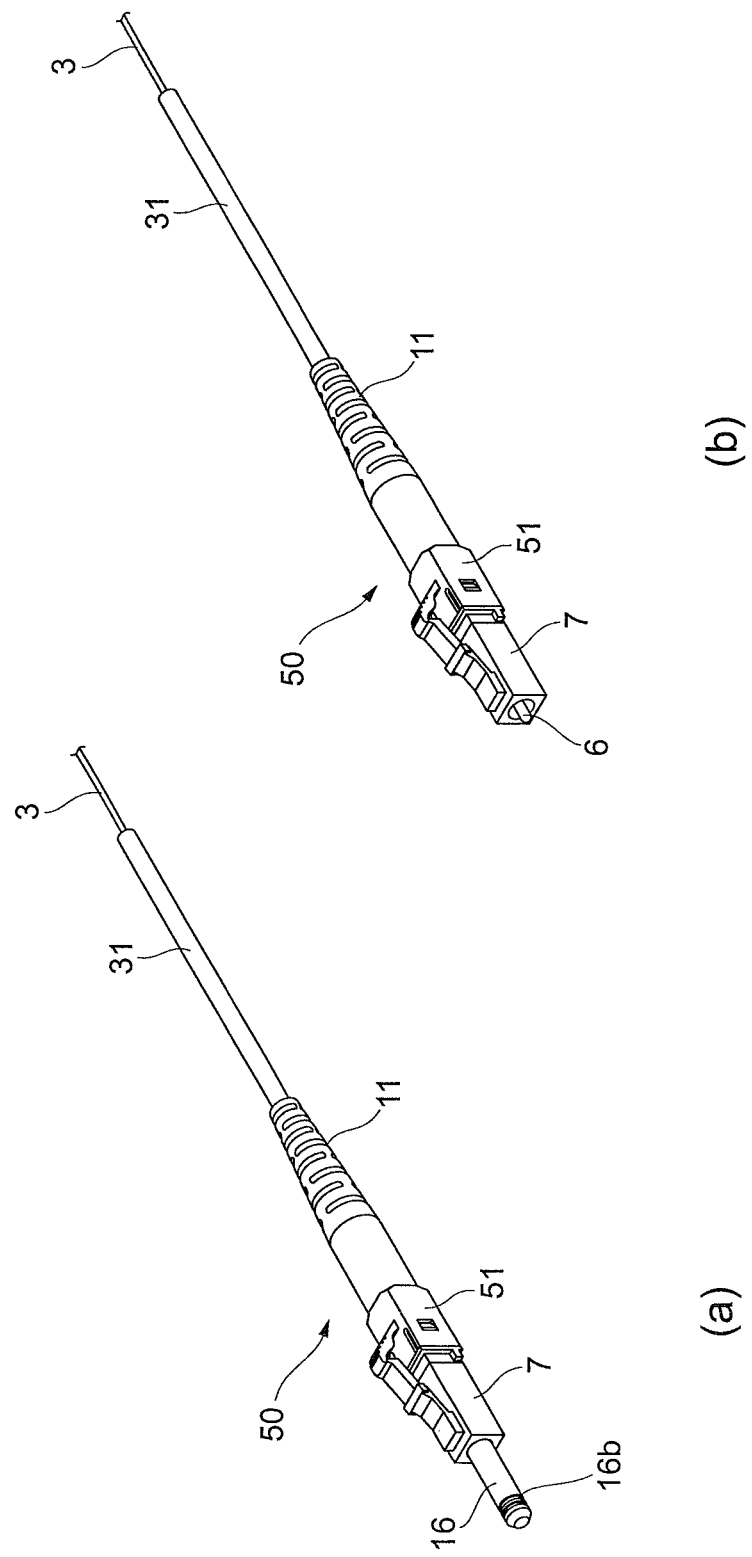
FIG. 15 is a perspective view illustrating still another optical connector assembled by one embodiment of the optical connector assembling method in accordance with the present invention.
Figure 16:
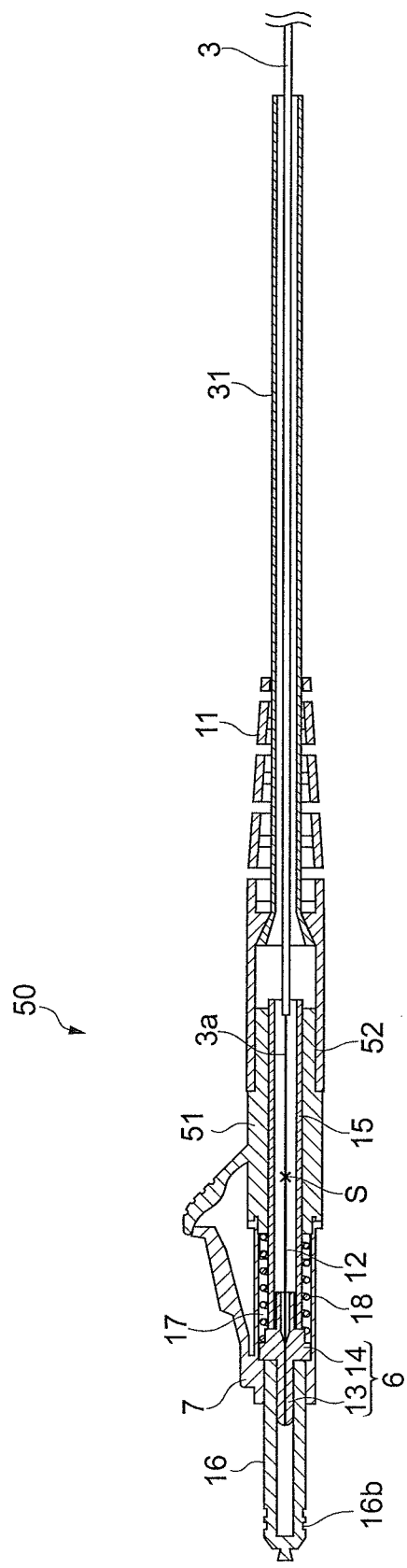
FIG. 16 is a sectional view of the optical connector illustrated in FIG. 15(a)

FIG. 15 is a perspective view illustrating still another optical connector assembled by one embodiment of the optical connector assembling method in accordance with the present invention. FIG. 16 is a sectional view of the optical connector illustrated in FIG. 15(a).

In each of the drawings, the optical connector 50 is a coated fiber type LC connector having the coated optical fiber 3 assembled thereto. The optical connector 50 comprises a rear housing 51 in place of the rear housing 8 in the above-mentioned embodiment. The optical connector 50 lacks the outer jacket holding member 9 and securing member 10 in the above-mentioned embodiment.

Figure 17:
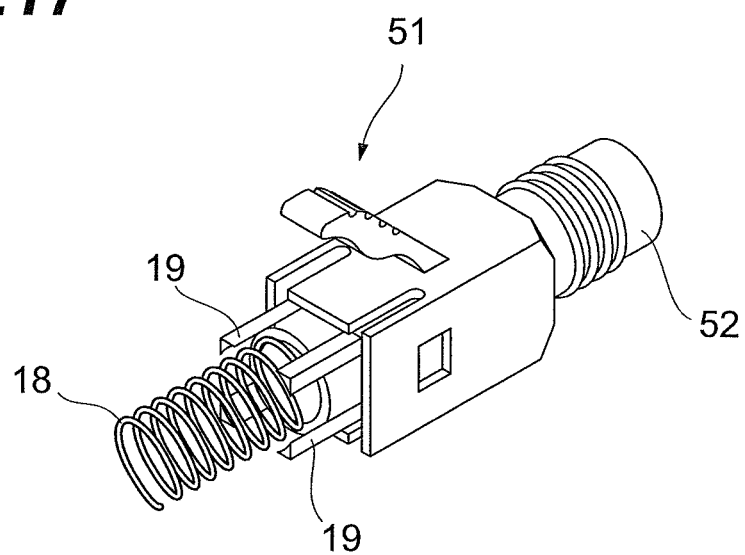
FIG. 17 is a perspective view of a rear housing equipped with a spring illustrated in FIG. 16.

As illustrated in FIG. 17, a front end part of the rear housing 51 is provided with four support projections 19 supporting the spring 18 as in the above-mentioned rear housing 8. A tubular part 52 is disposed on the rear side of the rear housing 51. As illustrated in FIGS. 15 and 16, the boot 11 having the reinforcement tube 31 attached thereto is mounted to the tubular part 52.

Figure 18:
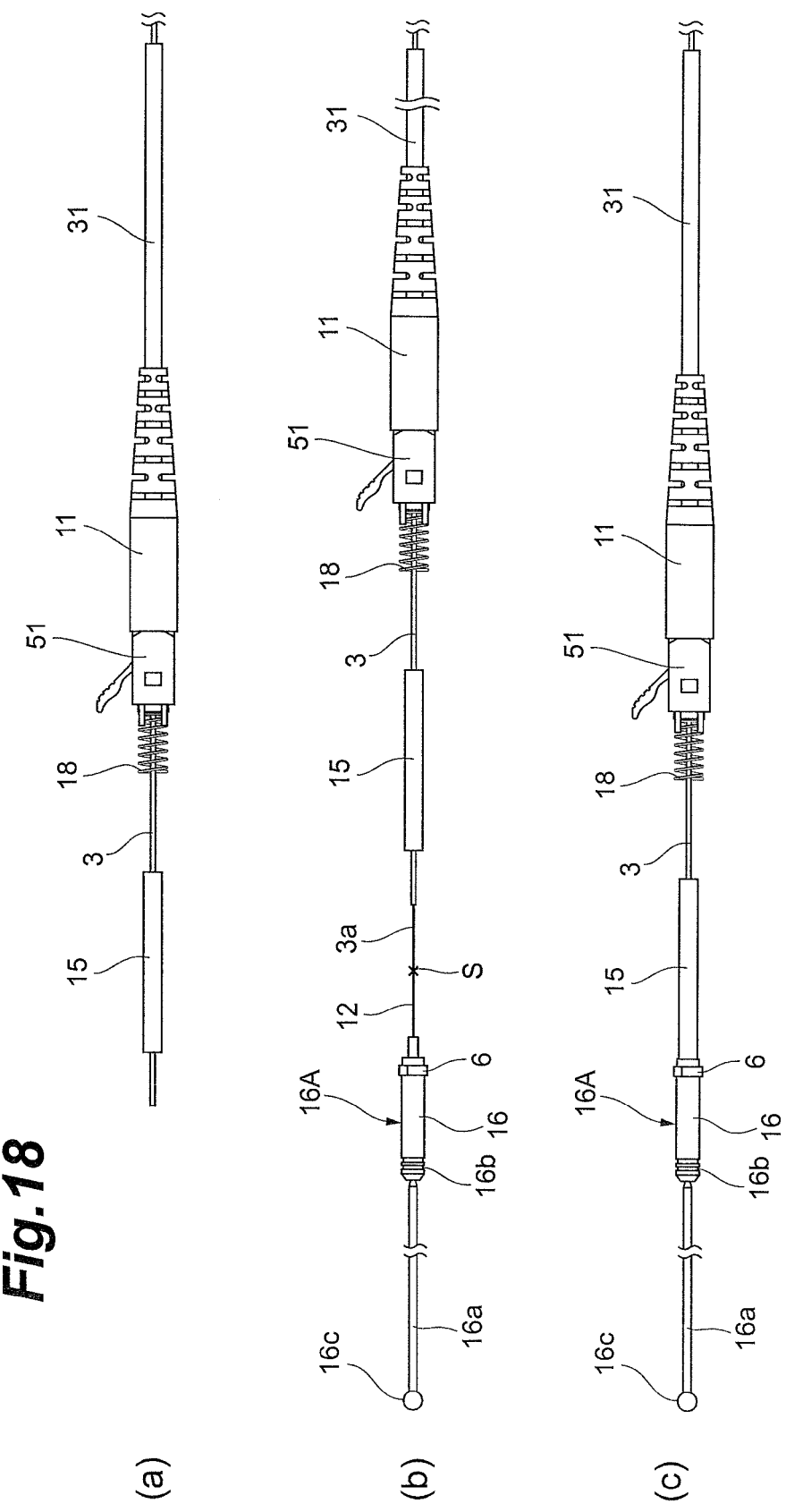
FIG. 18 is a view illustrating a procedure of assembling the optical connector depicted in FIG. 15(a)

First, when assembling thus configured optical connector 50, the fusion protection sleeve 15, the rear housing 51 having the spring 18 attached thereto, and the boot 11 having the reinforcement tube 31 attached thereto are arranged in this order from the front side, and the coated optical fiber 3 is inserted into these components from their rear side as illustrated in FIG. 18(a). Subsequently, as illustrated in FIG. 18(b), the handled dust cap 16A is mounted to the ferrule body 13 of the ferrule member 6, and the built-in fiber 12 held by the ferrule member 6 and the coated optical fiber 3 are fusion-spliced to each other as in the above-mentioned embodiment. Then, as illustrated in FIG. 18(c), the fusion protection sleeve 15 is moved to the position of the fusion-spliced part S between the built-in fiber 12 and the coated optical fiber 3 and heat-shrunk in this state.

Figure 19:
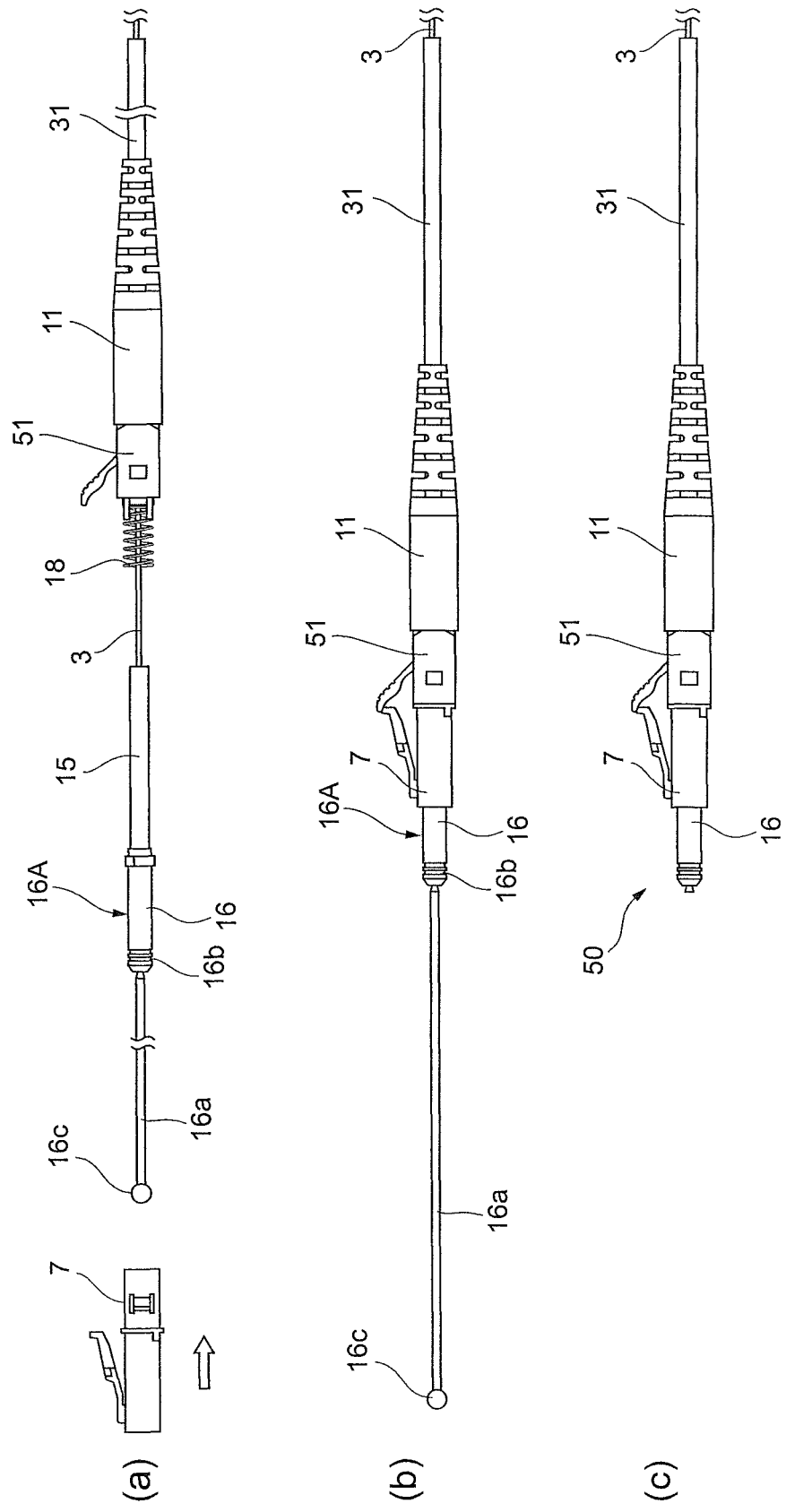
FIG. 19 is a view illustrating the procedure of assembling the optical connector depicted in FIG. 15(a)

Next, as illustrated in FIG. 19(a), the plug housing 7 is prepared. Then, as illustrated in FIG. 19(b), the handled dust cap 16A is passed through the plug housing 7, so as to assemble the plug housing 7 to the rear housing 51. Subsequently, as illustrated in FIG. 19(c), the handle of the handled dust cap 16A is cut off with fingers. The foregoing completes the optical connector 50 illustrated in FIG. 15(a).

Figure 20:
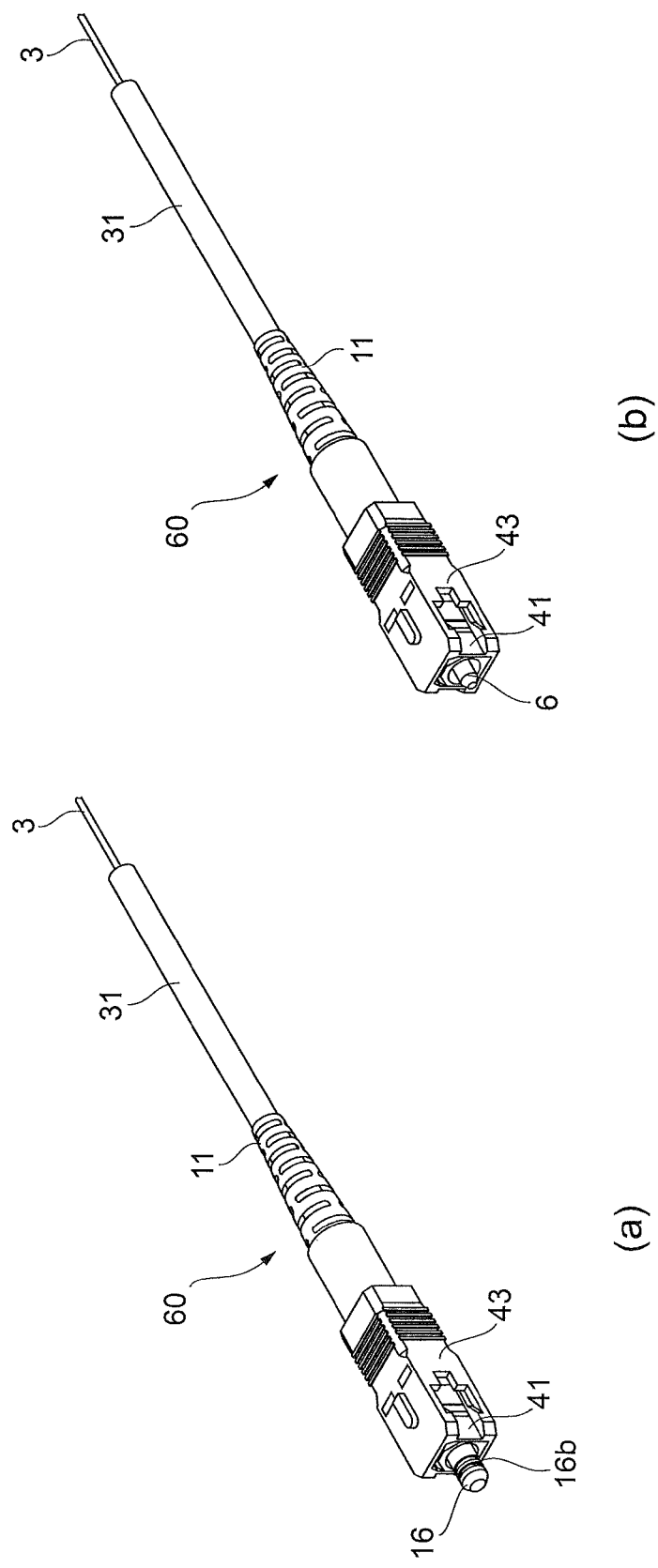
FIG. 20 is a perspective view illustrating still another optical connector assembled by one embodiment of the optical connector assembling method in accordance with the present invention.
Figure 21:
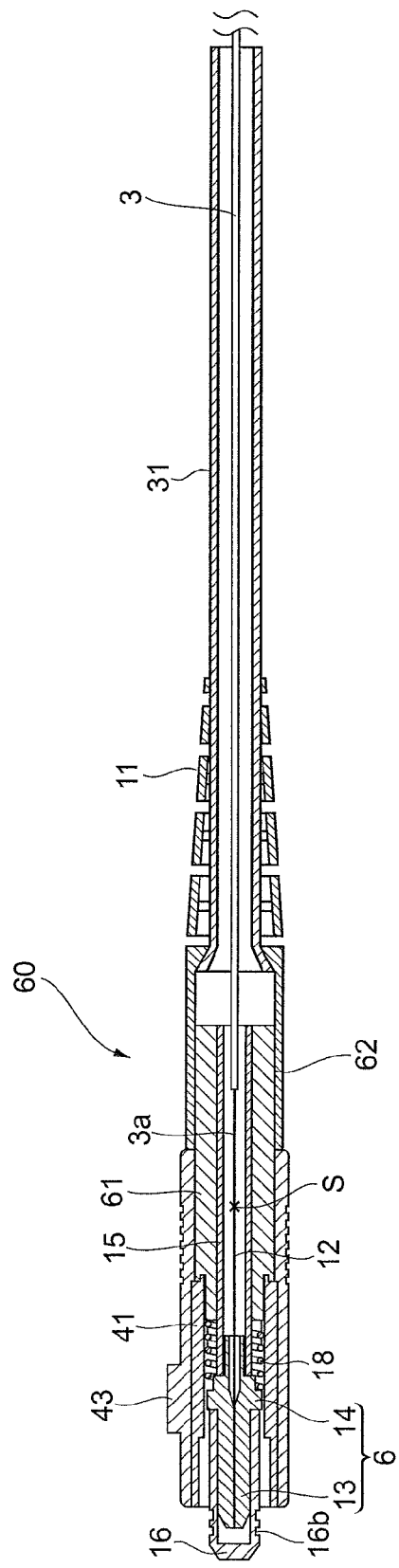
FIG. 21 is a sectional view of the optical connector illustrated in FIG. 20(a)

FIG. 20 is a perspective view illustrating still another optical connector assembled by one embodiment of the optical connector assembling method in accordance with the present invention. FIG. 21 is a sectional view of the optical connector illustrated in FIG. 20(a).

In each of the drawings, the optical connector 60 is a coated fiber type SC connector having the coated optical fiber 3 assembled thereto. The optical connector 60 comprises a rear housing 61 in place of the rear housing 42 in the above-mentioned embodiment. The optical connector 60 lacks the outer jacket holding member 9 and securing member 10 in the above-mentioned embodiment.

As in the above-mentioned rear housing 42, a front end part of the rear housing 61 is provided with four support projections 19 supporting the spring 18. A tubular part 62, to which the boot 11 is mounted, is disposed on the rear side of the rear housing 61.

First, when assembling thus configured optical connector 60, the handled dust cap 16A is mounted to the ferrule body 13 of the ferrule member 6, and the coated optical fiber 3 is passed through the fusion protection sleeve 15, the rear housing 61 having the spring 18 attached thereto, and the boot 11 having the reinforcement tube 31 attached thereto from their rear side as illustrated in FIG. 22(a). Then, in this state, the built-in fiber 12 held by the ferrule member 6 and the coated optical fiber 3 of the optical cord 2 are fusion-spliced to each other, and the fusion-spliced part S between the built-in fiber 12 and the coated optical fiber 3 of the optical cord 2 is reinforced by the fusion protection sleeve 15 as in the above-mentioned embodiment.

Figure 22:
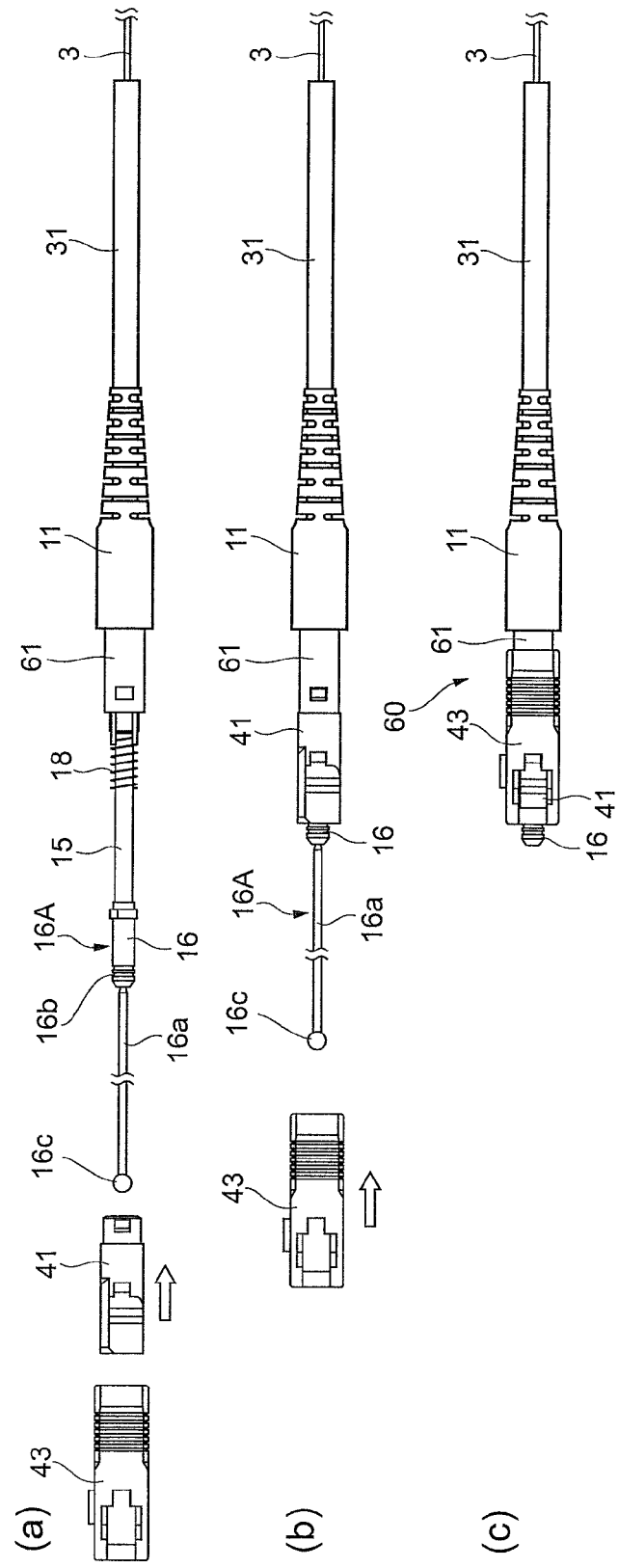
FIG. 22 is a view illustrating a procedure of assembling the optical connector depicted in FIG. 20(a).

Subsequently, as illustrated in FIG. 22(*b*), the handled dust cap 16A is passed through the plug housing 41, so as to assemble the plug housing 41 to the rear housing 61. Then, as illustrated in FIG. 22(*c*), the grip 43 is assembled to the plug housing 41 and rear housing 61, and thereafter the handle 16*a* is cut off from the handled dust cap 16A with fingers. The foregoing completes the optical connector 60 illustrated in FIG. 20(*a*).

REFERENCE SIGNS LIST

1 . . . optical connector; 3 . . . coated optical fiber; 6 . . . ferrule member; 7 . . . plug housing (first housing); 8 . . . rear housing (second housing); 12 . . . built-in fiber; 13 . . . ferrule body; 16 . . . dust cap (protection cap); 16A . . . handled dust cap (protection cap); 16*a* . . . handle; 40 . . . optical connector; 41 . . . plug housing (first housing); 42 . . . rear housing (second housing); 50 . . . optical connector; 51 . . . rear housing (second housing); 60 . . . optical connector; 61 . . . rear housing (second housing); S . . . fusion-spliced part

The invention claimed is:

1. A method for assembling an optical connector comprising a ferrule member having a ferrule body holding a built-in fiber, a first housing for accommodating the ferrule member, and a second housing for introducing therein an optical fiber to be connected to the built-in fiber, the method comprising the steps of:

mounting a protection cap to the ferrule body;

fusion-splicing an optical fiber that is introduced in the second housing and the built-in fiber to each other; and inserting the protection cap mounted with the ferrule body into the first housing, so as to assemble the first and second housings to each other, wherein the protection cap has a handle provided at an end thereof;

the method further comprising the step of cutting the handle off after performing the step of assembling the first and second housings to each other.

* * * * *